United States Patent [19]
Auman et al.

[11] Patent Number: 5,759,442
[45] Date of Patent: Jun. 2, 1998

[54] POLYIMIDE ALIGNMENT FILM FROM 2,2-BIS (3,4-DICARBOXYPHENYL)—HEXAFLUOROPROPANE DIANHYDRIDE AND ORTHO-SUBSTITUTED AROMATIC DIAMINES FOR ACTIVE MATRIX LIQUID CRYSTAL DISPLAYS

[75] Inventors: Brian Carl Auman, Newark, Del.; Edgar Bohm, Griesheim; Bernd Fiebranz, Munster, both of Germany

[73] Assignees: E. I. du Pont de Nemours and Company, Wilmington, Del.; Merck Patent GmbH, Darmstadt, Germany

[21] Appl. No.: 813,716

[22] Filed: Mar. 7, 1997

Related U.S. Application Data

[63] Continuation of Ser. No. 542,765, Oct. 13, 1995, abandoned.

[51] Int. Cl.⁶ ............... C09K 19/56; G02F 1/133
[52] U.S. Cl. .................. 252/299.4; 528/353; 349/123
[58] Field of Search ............ 252/299.4; 528/353; 349/123

[56] References Cited

U.S. PATENT DOCUMENTS

| | | | |
|---|---|---|---|
| 4,381,886 | 5/1983 | Yokokura et al. | 359/53 |
| 4,912,197 | 3/1990 | Hayes | 528/353 |
| 5,344,916 | 9/1994 | Harris et al. | 528/353 |

FOREIGN PATENT DOCUMENTS

| | | | |
|---|---|---|---|
| 0365855 | 5/1990 | European Pat. Off. | G02F 1/133 |
| 0456463 | 11/1991 | European Pat. Off. | G02F 7/038 |
| 0540829 | 5/1993 | European Pat. Off. | |
| 0635533 | 1/1995 | European Pat. Off. | |

*Primary Examiner*—C. H. Kelly

[57] ABSTRACT

A polyimide alignment film based on 2,2-bis(3,4-dicarboxyphenyl)hexafluoropropane dianhydride and ortho-substituted aromatic diamines, such as 2,3,5,6-tetramethyl-p-phenylene diamine, 2,4,6-trimethyl-m-phenylene diamine and 1,5-diaminonaphthalene, providing high voltage holding ratio and high tilt angle when used in active matrix liquid crystal displays.

16 Claims, No Drawings

POLYIMIDE ALIGNMENT FILM FROM 2,2-BIS (3,4-DICARBOXYPHENYL)—HEXAFLUOROPROPANE DIANHYDRIDE AND ORTHO-SUBSTITUTED AROMATIC DIAMINES FOR ACTIVE MATRIX LIQUID CRYSTAL DISPLAYS

This is a continuation of application Ser. No. 08/542,765 filed Oct. 13, 1995, now abandoned.

BACKGROUND OF THE INVENTION

1. Field of the Invention

The present invention relates to a polyimide alignment film based on 2,2-bis(3,4-dicarboxyphenyl)-hexafluoropropane dianhydride (6FDA) and 1,5-diaminonaphthalene (DAN) or m- or p-phenylene diamines, which are substituted ortho to the amino groups with alkyl groups containing from 1 to 4 carbon atoms, such as 2,3,5,6-tetramethyl-p-phenylene diamine (DAD) or 2,4,6-trimethyl-m-phenylene diamine (DAM), and to an active matrix liquid crystal display device using such an alignment film.

2. Description of the Prior Art

Liquid crystal display (LCD) devices have become increasingly important in displays which require very low consumption of electrical power or where the environment dictates a lightweight, planar, flat surface. Thus, LCD's are used in display devices such as wristwatches, pocket and personal computers, aircraft cockpit displays, etc.

In its simplest form, a liquid crystal display device consists of a liquid crystal layer with opposite sides, a set of electrodes on either side of the liquid crystal layer and an alignment polymer layer between each set of electrodes and the liquid crystal layer. Alignment of the liquid crystal molecules occurs at a certain angle, referred to as the tilt angle, with respect to the plane of the inside of two substrates, e.g. glass plates, plastic sheets, quartz plates or others, which support the electrodes. The inside of the substrates have coatings of sets of transparent electrodes (electrical conductors), usually indium-tin oxide (ITO). The sets of electrodes are patterned, e.g. by etching, compatible with the information to be displayed by the LCD. The alignment process is most easily carried out by solution casting (spin coating, roller coating, dipping, spraying, printing and/or doctor blading) an organic polymer onto the two ITO coated substrates. After removal of the solvents and/or curing of the polymer layers, the substrates are usually rubbed or buffed in one direction with cloths. The rubbing process serves to establish a unique optical direction. After rubbing both substrates, they are rotated from 70 to 360 degrees with respect to each other; adhered together using organic adhesives and appropriate spacers to preserve a constant thickness to a space or gap between the substrates; and filled with various mixtures of liquid crystal materials. At this stage, polarizing films are often attached to the outside surfaces of the substrates by a lamination process. Finally, electrical connections are made to both substrates in a manner consistent with the electrical and display designs.

The use of rubbed polymer films, i.e. alignment direction and tilt angle controlling films, dominates the process technology used in the production of all categories of liquid crystal displays, and polyimides are the most common alignment films in use today. Moreover, the tilt angle and its magnitude are very important in the various electro-optic responses and the electro-optic properties of the LCD device. The stability, legibility and reliability of the LCD are all related to the magnitude and stability of the tilt angle. The tilt angle has to be stable to high temperature and illumination, and the magnitude of the tilt angle has to be stable for long storage times in order to provide a long operational time for the displays. This holds particularly for the value of the tilt angle obtained after the heat treatment of the display after or during sealing of the cells filled with liquid crystals.

Polyimide films used to control the alignment direction and the tilt angle of the liquid crystal molecules in liquid crystal displays are very thin, generally being on the order of from 100 to 2000 angstroms. The alignment is induced in a unique direction of the polyimide polymer by gentle buffing with specific cloths. The actual tilt angle obtained is a function of polymer ordering on the surface, the resulting surface energy, the nature of the cloth used to buff the surface and the amount of buffing work. In addition to these variables, each of the hundreds of commercial liquid crystal formulations interacts differently with a given surface. In general, however, the single most important factor determining the value range of the tilt angle is the intrinsic character of the polyimide used to control this angle. Twisted nematic (TN) LCD's, including active matrix (AM) TN LCD's, such as those used in pocket TV sets and watches, generally require lower tilt angles in the range of 1 to 5 degrees. Supertwisted nematic (STN) LCD's require higher tilt angles, typically between 4 to 30 and particularly between 5 to 15 degrees.

Thus, polyimide alignment films for liquid crystal displays must exhibit certain key properties including stable and predictable alignment of liquid crystal molecules and sufficiently high tilt angle. In addition, for active matrix displays, the polyimide alignment film must also have a high value of the so-called voltage holding ratio (VHR). The active matrix electrode layer comprises nonlinear addressing elements such as, for example, thin film transistors (TFT), metal-insulator-metal (MIM) diodes or metal-silicon nitride-indium tin oxide (MSI) diodes which are integrated with the image point. Each image point represents a capacitive load with respect to the particular active nonlinear element, which is charged at the rhythm of the addressing cycle. In this cycle, it is of paramount importance that the voltage applied to an addressed image point drops only slightly until the image point is again charged in the next addressing cycle. A quantitative measure of the drop in voltage applied to an image point is the voltage holding ratio (VHR) which is defined as the ratio of the drop in voltage across an image point in the nonaddressed state to the voltage applied. A process for determining the VHR is given, for example, by B. Rieger et al., in Conference Proceedings der Freiburger Arbeitstagung Flussigkristalle (Freiburg Symposium on Liquid Crystals), Freiburg, 1989. Electro-optical systems having a low or relatively low VHR show insufficient contrast.

Currently, aromatic fluorinated polyimides having moderate to high tilt angles are known for use as alignment layers in conventional twisted nematic and more advanced super twisted nematic displays.

For active matrix applications, however, such fluorinated aromatic polyimides can suffer from low voltage holding ratio (VHR). The polyimide alignment film of the present invention is based on 2,2-bis(3,4-dicarboxyphenyl) hexafluoropropane dianhydride (6FDA) as the tetracarboxylic dianhydride component and 1,5-diaminonaphthalene (DAN) or m- or p-phenylene diamines, which are substituted ortho to the amino groups with alkyl groups, such as 2,3,5,6-tetramethyl-p-phenylene diamine (DAD) or 2,4,6- trimethyl-m-phenylene diamine (DAM), as the diamine component and overcome the drawbacks of low VHR characteristic of the conventional fluorinated aromatic polyimide alignment films. The polyimide alignment film of the present invention provides stable and predictable alignment of liquid crystal molecules, sufficiently high tilt angle, and particularly for active matrix applications, high voltage holding ratio and low residual DC. Furthermore, the polyimide alignment film also shows the ability, when modified with certain comonomers, to give even higher tilt angles, which are necessary for advanced applications in active matrix (AM) displays and super twisted nematic (STN) displays.

European Patent Application 0 365 855, published on May 2, 19990, discloses an orientation layer for a liquid display device comprising a poly(amic acid) obtained by reacting a tetracarboxylic acid dianhydride and a tetraalkyl substituted p-phenylene diamine, such as 2,3,5,6-tetramethyl-p-phenylene diamine. The poly(amic acid) is thermally cured at 250° C. to form a polyimide film. 2,2-Bis(3,4-dicarboxyphenyl)-hexafluoropropane dianhydride (6FDA) is not disclosed as a required tetracarboxylic acid dianhydride component, however. Moreover, the liquid crystal mixtures disclosed (e.g. ZLI-2293) are suitable for passive type TN or STN displays but are not suitable for active matrix displays which require high voltage holding ratios. Active matrix displays or liquid crystal mixtures suitable for active matrix displays are not disclosed.

In addition, the 250° C. curing temperature required to convert the poly(amic acid) to the polyimide is too high for the thin-film transistors used in active matrix displays. Typically, a curing temperature of less than 220° C., preferably less than 200° C., should be used to cure the poly (amic acid) which would result in incomplete conversion to the polyimide and accompanying variability in the tilt angle, insufficient stability of the alignment and the tilt angle and typically insufficiently high voltage holding ratio.

Typically, alignment layers for active matrix displays are preimidized, soluble polyimides which eliminate the need for high cure temperatures and only the solvent needs to be removed. Because of the rigidity of the tetracarboxylic dianhydrides disclosed in the reference, none of the resulting polyimides would be expected to have the required solubility.

European Patent Application 0 456 463, published on Nov. 13, 1991, discloses a photoimageable polyimide coating composition comprising 2,2-bis-(3,4-dicarboxyphenyl) hexafluoropropane dianhydride (6FDA), a tetravalent benzophenone photosensitizing moiety and 2,3,5,6-tetramethyl-p-phenylene diamine (DAD) or 2,4,6-trimethyl-m-phenylene diamine (DAM). The polyimide is used as a photoimageable coating for microelectronic applications which is imagewise exposed and selectively etched to form a pattern. There is no disclosure, however, of a 6FDA/BTDA/DAD or DAM polyimide alignment layer for use in an active matrix liquid crystal display and that provides a high voltage holding ratio.

U.S. Pat. No. 4,912,197, issued on Mar. 27, 1990, discloses highly soluble, transparent to clear aromatic polyimides derived from 2,2-bis-(3,4-dicarboxyphenyl)-hexafluoropropane dianhydride (6FDA), which can be partially replaced with 3,3',4,4'-benzophenone tetracarboxylic dianhydride (BTDA), and 2,4,6-trimethyl-m-phenylene diamine (DAM) or 2,3,5,6-tetramethyl-p-phenylene diamine (DAD). There is no disclosure, however, of a 6FDA/BTDA/DAM or DAD polyimide film for use as an alignment layer in an active matrix liquid crystal display and that provides a high voltage holding ratio.

SUMMARY OF THE INVENTION

The present invention provides a polyimide alignment film for aligning a liquid crystal layer of an active matrix liquid crystal display device comprising an aromatic tetracarboxylic dianhydride component containing from 40 to 100 mole %, based on the total molar amount of aromatic tetracarboxylic dianhydride component, of 2,2-bis(3,4-dicarboxyphenyl)-hexafluoropropane dianhydride and an aromatic diamine component containing from 80 to 100 mole %, based on the total molar amount of aromatic diamine component, of an aromatic diamine of the formula

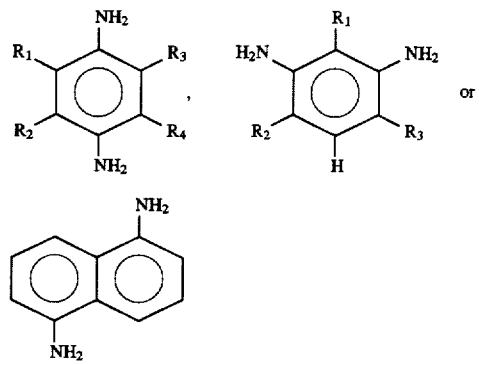

wherein $R_1$ to $R_4$ are alkyl groups containing from 1 to 4 carbon atoms and wherein said polyimide alignment film provides said liquid crystal layer with a voltage holding ratio of greater than 95%, more preferably greater than 98% and most preferably greater than 99%.

In a preferred embodiment of the invention, the polyimide alignment film can also be adapted to provide the liquid crystal layer with a constant tilt angle of 3 degrees or more by incorporation of up to 20 mole % of an additional aromatic diamine containing pendant alkyl, fluoroalkyl or perfluoroalkyl groups containing from 1 to 16, preferably from 8 to 10, carbon atoms.

The present invention further provides an active matrix liquid crystal display device comprising:

(a) a liquid crystal layer having opposite sides;

(b) a set of electrodes on either side of said liquid crystal layer; and (c) a polyimide alignment film layer, between each set of electrodes and said liquid crystal layer, comprising an aromatic tetracarboxylic dianhydride component containing from 40 to 100 mole %, based on the total molar amount of aromatic tetracarboxylic dianhydride component, of 2,2-bis-(3,4-dicarboxyphenyl)-hexafluoropropane dianhydride and an aromatic diamine component containing from 80 to 100 mole %, based on the total molar amount of aromatic diamine component, of an aromatic diamine of the formula

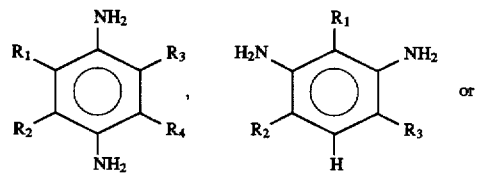

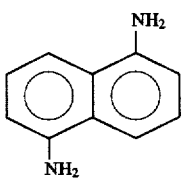

wherein R₁ to R₄ are alkyl groups containing from 1 to 4 carbon atoms and wherein said polyimide alignment film provides said liquid crystal layer with a voltage holding ratio of greater than 95%, more preferably greater than 98% and most preferably greater than 99%.

The active matrix liquid crystal displays of the present invention are characterized by having tilt angles of at least 1 degree, preferably of more than 2 degrees, more preferably of more than 3 degrees and most preferably of more than 4 degrees, which are maintained at the upper LCD operating temperature and even after storage under adverse conditions.

DETAILED DESCRIPTION OF THE INVENTION

The polyimide used as an alignment film layer in the active matrix liquid crystal display device of the present invention is the polymerization-imidization reaction product of an aromatic tetracarboxylic dianhydride component with an aromatic diamine component.

The aromatic tetracarboxylic dianhydride component comprises from 40 to 100 mole %, preferably from 50 to 100 mole %, of 2,2-bis(3,4-dicarboxyphenyl)-hexafluoropropane dianhydride. The aromatic tetracarboxylic dianhydride component may, in addition, contain from 0 to 60 mole %, preferably from 20 to 50 mole %, of other tetracarboxylic dianhydrides or other functional derivatives such as tetracarboxylic acids or esters or mixtures thereof.

Tetracarboxylic dianhydrides that can be used in combination with the 2,2-bis(3,4-dicarboxyphenyl)-hexafluoropropane dianhydride include, but are not limited to, 3,3'4,4'-biphenyltetracarboxylic dianhydride, 2,3,3',4'-biphenyltetracarboxylic dianhydride, 3,3',4,4'-benzophenonetetracarboxylic dianhydride, 2,2-bis-(3,4-dicarboxyphenyl)propane dianhydride, 1,4,5,8-naphthalenetetracarboxylic dianhydride, 2,3,6,7-naphthalenetetracarboxylic dianhydride, 1,2,5,6-naphthalenetetracarboxylic dianhydride, bis(3,4-dicarboxyphenyl)sulfone dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)methane dianhydride, oxydiphthalic dianhydride, 1,4-bis(3,4-dicarboxyphenoxy)benzene dianhydride, 1,3-bis(3-4-dicarboxybenzoyl)benzene dianhydride, pyromellitic dianhydride, 9,9-bis(trifluoromethyl)-2,3,6,7-xanthenetetracarboxylic dianhydride, 9-phenyl-9-(trifluoromethyl)-2,3,6,7-xanthenetetracarboxylic dianhydride, 2,3,5,-tricarboxycyclopentyl acetic acid dianhydride and cyclobutanetetracarboxylic dianhydride. These tetracarboxylic dianhydrides may be used alone or in combination. 3,3'4,4'-Benzophenonetetracarboxylic dianhydride (BTDA) is a particularly preferred tetracarboxylic dianhydride for use in combination with 2,2-bis(3,4-dicarboxyphenyl) hexafluoropropane dianhydride (6FDA).

When the tetracarboxylic dianhydride component to be polymerized with the aromatic diamine component contains less than 40 mole % of 2,2-bis(3,4-dicarboxyphenyl) hexafluoropropane dianhydride, the solubility of the resulting polyimide may be too low and the tilt angle and the voltage holding ratio may be too low for use in an active matrix liquid crystal display.

The aromatic diamine component comprises from 80 to 100 mole %, preferably from 90 to 100 mole %, of an aromatic diamine of the formula

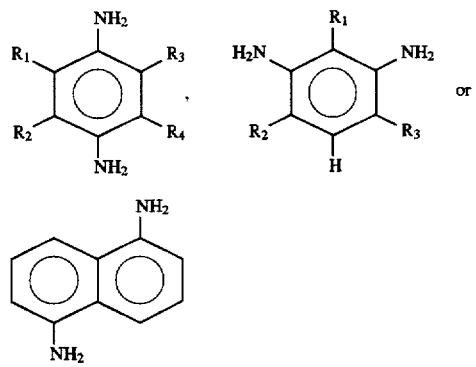

wherein R₁ to R₄ are linear or branched-chain alkyl groups containing from 1 to 4 carbon atoms.

Suitable aromatic diamines that can be used in the present invention include 1,5-diaminonaphthalene, 2,3,5,6-tetramethyl-p-phenylene diamine, 2,3,5,6-tetraethyl-p-phenylene diamine, 2,3,5,6-tetrapropyl-p-phenylene diamine, 2,3,5,6-tetraisopropyl-p-phenylene diamine, 2,3,5,6-tetrabutyl-p-phenylene diamine, 2,3,5,6-tetraisobutyl-p-phenylene diamine, 2,3-diethyl-5,6-dimethyl-p-phenylene diamine, 2,5-diethyl-3,6-dimethyl-p-phenylene diamine, 2,-ethyl-3,5,6-trimethyl-p-phenylene diamine, 3-ethyl-2,6-dimethyl-5-propyl-p-phenylene diamine, 3-ethyl-2,5-dimethyl-6-propyl-p-phenylene diamine, 6-butyl-3-ethyl-2-methyl-5-propyl-p-phenylene diamine and 2,4,6-trimethyl-m-phenylene diamine. These aromatic diamines may be used alone or in combination. A preferred aromatic diamine for use in the present invention is 2,3,5,6-tetramethyl-p-phenylene diamine (DAD).

In a particularly preferred embodiment of the present invention, the aromatic diamine component may, in addition, contain from 0 to 20 mole %, preferably from 0 to 10 mole %, of certain aromatic diamine comonomers to provide higher tilt angles of 3 degrees or more required to align super twisted nematic (STN) and active matrix displays (AMD).

Suitable aromatic diamine comonomers include aromatic diamines containing at least one linear or branched alkyl, fluoroalkyl or perfluoroalkyl group containing from 1 to 16, preferably from 8 to 10 carbon atoms.

The use of fluorinated carbon atom chains, herein abbreviated at RfX (wherein Rf stands for the perfluoroalkyl chain and X refers to the number of perfluorinated carbon atoms in the chain), attached directly to the aromatic diamine ring, i.e., Ar—RfX, without any intervening atoms, such as for example structures having the formulas

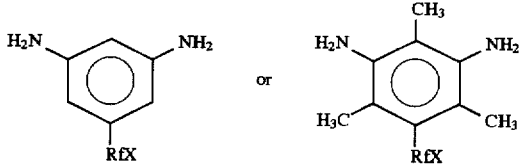

wherein X is from 1 to 16, preferably from 8 to 10, provide adequate voltage holding ratio, together with high tilt angle and are preferred.

In other cases, the RfX group can be attached in very close proximity to the aromatic diamine ring through intervening atoms such as Ar—O—CH$_2$—RfX, Ar—CH$_2$—RfX, Ar—C(CH$_3$)$_2$—RfX, Ar—CH$_2$O—(CH$_2$)$_{1-6}$RfX, Ar—COO(CH$_2$)$_2$—RfX, AR—CO—RfX, Ar—COO—C$_6$H$_4$—RfX, AR—COO—C$_6$H$_4$—ORfX, Ar—CONH—C$_6$H$_4$—RfX, Ar—CONH—C$_6$H$_4$—ORfX or Ar—CONH—RfX, wherein Ar has the formula

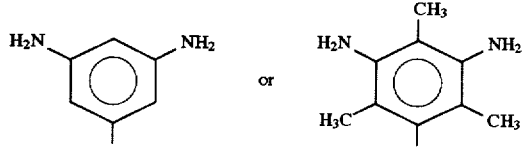

and X is 1 to 16.

Specific examples of alkyl, fluoroalkyl or perfluoroalkyl group containing aromatic diamine comonomers include, but are not limited to, 5-perfluorohexyl-1,3-phenylene diamine, 5-perfluorooctyl-1,3-phenylene diamine, 5-perfluorodecyl-1,3-phenylene diamine, 5-perfluorohexyl-1,3-diaminomesitylene, 5-perfluorooctyl-1,3-diaminomesitylene, 5-perfluorodecyl-1,3-diaminomesitylene, 4'-trifluoromethoxyphenyl-3,5-diaminobenzamide, 1-[2,2-bis(trifluoromethyl)-3,3,4,4,5,5,5-heptafluoropentyl]-3,5-diaminobenzene, 4-(1,1,11-trihydroperfluoroundecyloxy)-1,3-phenylene diamine, 3,5-diamino-1H,1H,2H,2H-heptafluorodecyl-benzoate, 3,5-diaminodecylbenzoate, and 3,5-diaminohexadecylbenzoate.

Aromatic or aliphatic monoamines can also be used but limit the molecular weight and are less preferred, e.g. N-dodecylamine, perfluorooctyl-3-aminobenzene, N-hexadecylamine, 1-(4-aminophenyl)dodecane and 1-amino-3-perfluorodecyl-n-propane.

Preferred embodiments of the polyimides of the present invention include copolymers containing up to 80 mole %, more preferably up to 70 mole %, and most preferably up to 50 mole % of 6FDA as the tetracarboxylic dianhydride component and, preferably, DAM or DAD as the aromatic diamine component. Polyimide homopolymers containing only 6FDA as the tetracarboxylic dianhydride and DAD, DAM or 1,5-DAN as the diamine component can also be used as alignment films in the present invention.

The active matrix liquid crystal displays of the present invention are characterized by having voltage holding ratios of over 95%, preferably over 97%, more preferably over 98% and most preferably over 99%. These high voltage holding ratios are also maintained at the upper operation temperature level of the liquid crystal display device, and are maintained even upon storage under adverse conditions.

The polyimide alignment film of the present invention may be prepared by solution polymerization of substantially equimolar amounts of the aromatic tetracarboxylic acid component and the aromatic diamine component at ambient room temperature to 50° C. in N-methylpyrrolidone or N,N-dimethylacetamide as the solvent.

The resulting poly(amic acid) solution is then imidized by chemical imidization using acetic anhydride and pyridine at 50° C. or by thermal imidization by heating at 150° to 220° C., preferably at 180° to 200° C. The polyimide is precipitated, removed by filtration and dried under vacuum. The polyimide is then dissolved in gamma-butyrolactone solvent and coated by spin coating onto indium-tin oxide (ITO) coated glass plates and then dried at a temperature of from 150° C. to 220° C. for from 1 minute to 2 hours, preferably from 180° to 200° C. for from 30 minutes to 2 hours to form a polyimide coating. The polyimide coating is further subjected to a rubbing treatment, which is well-known in the art, to provide an alignment controlling film of the invention. The thickness of the alignment film typically ranges from 100 to 2000 angstroms and can be adjusted by varying the amount of polymer applied or the coating method used.

A review of conventional alignment controlling techniques is given, for example, by I. Sage in Thermotropic Liquid Crystals, edited by G. W. Gray, John Wiley & Sons, 1987, pages 75 to 77 and by J. M. Geary et al. in Journal of Applied Physics, Vol. 62(10), 1987, pages 4100–4108.

A pair of the glass substrates covered with the electrodes and coated with the alignment controlling film are placed in opposition to each other, so that the respective alignment films face each other, and are rotated so that their mutual orientation directions (induced e.g. by rubbing) form a predetermined angle to each other and then are bonded to each other to form a predetermined space by interposing spacers between them or by some other means. An active matrix liquid crystal composition, for example, ZLI-4792, (sold by Merck, KGaA, Germany) is filled into said space and then the filling hole is sealed with an adhesive.

Light polarizer layers are deposited on both outside glass surfaces. The directions of polarization of the two polarizers are adjusted with respect to each other, depending on the specific cell configuration. The polarizer orientations are described, for example, in European Patent 01 31 216 and European Patent 02 60 450, while other orientations can also be used. In active matrix addressed TN displays, the two directions are either substantially perpendicular (normally white cells) or substantially parallel (normally black cells) to each other. The liquid crystals assume a spiral orientation through the thickness of the layer following the alignment of the liquid crystals by the two alignment layers which have directions from substantially 70° to 360° to each other. Twist angles, from 70° to 110° are particularly preferred for TN displays. Twist angles higher than 90° can be obtained by adding a suitable doping component to the liquid crystal mixture.

A particularly preferred active matrix liquid crystal aligning film of the present invention comprises a polyimide derived from 50 mole % of 2,2-bis(3,4-dicarboxyphenyl) hexafluoropropane dianhydride, 50 mole % of 3,3',4,4'-benzophenonetetracarboxylic dianhydride and 100 mole % of 2,3,5,6-tetramethyl-p-phenylene diamine, which has a very high voltage holding ratio of greater than 99% (measured after 5 minutes at 100° C.), a stable tilt angle of from 2 to 2.5 degrees (measured after 1 hour at 150° C.) using a rayon rubbing cloth and a low residual DC of from 0 to 50 mV.

Liquid crystal mixtures that can be used in the liquid crystal displays of the present invention include high holding ratio LC mixtures for active matrix addressed twisted nematic displays which are based on superfluorinated materials (SFM's).

The liquid crystal mixtures used in the LCD's according to the present invention preferably contain at least one compound of formula (I).

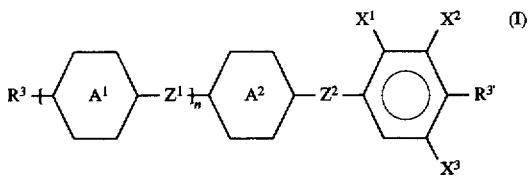

wherein

R³ is an alkyl group containing from 1 to 12 carbon atoms wherein, in addition, one or two non-adjacent —CH₂— groups can be replaced by —O—, —CO—, —COO—, —OCO— or —CH=CH—;

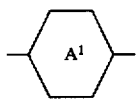

and

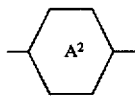

independently of one another, are trans-1,4-cyclohexylene, 1,4-phenylene, 2-fluoro-1,4-phenylene, 3-fluoro-1,4-phenylene, 2,3-difluoro-1,4-phenylene or 3,5-difluoro-1,4-phenylene, or one of

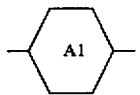

and

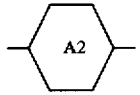

is alternatively pyrimidine-2,5-diyl, pyridine-2,5-diyl or trans-1,4-dioxane-2,5-diyl;

$Z_1$ and $Z_2$, independently of one another, are a direct bond, —CH₂CH₂—, —COO—, —OCO—, —CH=CH— or —C≡C—;

$X^1$, $X^2$ and $X^3$, independently of one another, are H or F;

$R^{3'}$ is the same as $R^3$ or is Q—Y;

Q is —CF₂—, —OCF₂—, —C₂F₄— or a direct bond;

Y is H, F, Cl or CN; and n is 0, 1 or 2.

The proportion of one or more compounds of the formula (I) in the liquid crystal mixtures used according to the invention is preferably more than 15% by weight and, more particularly, more than 20% by weight. Liquid crystal mixtures containing more than 40% by weight and particularly more than 50% by weight of one or more compounds of the formula (I) are particularly preferred.

The liquid crystal mixtures used according to the invention can contain further components which are preferably selected from nematic or nematogenic (monotropic or isotropic) substances, in particular substances selected from the group consisting of azoxybenzenes, benzylideneanilines, biphenyls, terphenyls, phenyl or cyclohexyl benzoates, phenyl or cyclohexyl cyclohexanecarboxylates, phenyl or cyclohexyl cyclohexylbenzoates, phenyl or cyclohexyl cyclohexylcyclohexanecarboxylates, cyclohexylphenyl benzoates, cyclohexyphenyl cyclohexanecarboxylate, cyclohexylphenyl cyclohexylcyclohexanecarboxylate, phenylcyclohexanes, cyclohexylbiphenyls, phenylcyclohexylcyclohexanes, cyclohexylcyclohexanes, cyclohexylcyclohexenes, cyclohexylcyclohexylcyclohexenes, 1,4-bis(cyclohexyl)benzenes, 4,4'-bis(cyclohexyl)biphenyls, phenyl- or cyclohexylpyrimidines, phenyl- or cyclohexylpyridines, phenyl- or cyclohexyldioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl)ethanes, 1-cyclohexyl-2-biphenylylethanes, 1-phenyl-2-cyclohexylphenylethanes, halogenated or unhalogenated stilbenes, benzyl phenyl ethers, tolans and substituted cinnamic acids. The 1,4-phenylene groups in these compounds can also be fluorinated.

The liquid crystal mixtures used in the electro-optical systems according to the invention may also contain one or more dielectrically neutral compounds having formulas (II) to (V).

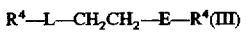

In the formulas (II) and (III) above, L and E may be identical or different and are each, independently of one another, a divalent radical selected from the group consisting of —Phe—, —Cyc—, —Phe—Phe—, —Phe—Cyc—, —Cyc—Cyc—, —Pyr—, —Dio—, —G—Phe— and —G—Cyc— and mirror images thereof. Phe is unsubstituted or fluorine substituted 1,4-phenylene. Cyc is trans-1,4-cyclohexylene or 1,4-cyclohexenylene. Pyr is pyrimidine-2,5-diyl or pyridine-2,5-diyl. Dio is 1,3-dioxane-2,5-diyl and G is 2-(trans(-1,4-cyclohexyl)ethyl, pyrimidine-2,5-diyl, pyridine-2,5-diyl or 1,3-dioxane-2,5-diyl. One of the radicals L and E is preferably Cyc, Phe or Pyr. E is preferably Cyc, Phe or Phe—Cyc.

The liquid crystals used in the invention preferably contain one or more components selected from compounds of formulas (II) and (III), wherein L and E are selected from the group consisting of Cyc, Phe and Pyr and simultaneously one or more components are selected from the compounds of formulas (II) and (III), wherein one of the radicals L and E is selected from the group comprising Cyc, Phe and Pyr and the other radical is selected from the group consisting of —Phe—Phe—, —Phe—Cyc—, —Cyc—Cyc—, —G—Phe— and —G—Cyc—, and, if desired, one or more components are selected from the compounds of formulas (II) and (III), wherein the radicals L and E are selected from the group consisting of —Phe—Cyc—, —Cyc—Cyc—, —G—Phe— and —G—Cyc—.

R⁴ and R⁵ in the compounds of formulas (II) and (III) are each, independently of one another, preferably alkyl, alkenyl, alkoxy, aklenyloxy or alkanoyloxy having up to 8 carbon atoms. In most of these compounds, R⁴ and R⁵ are different from one another, one of R⁴ and R⁵ being in particular alkyl, alkoxy or alkenyl.

Especially preferred is the following group of dielectrically neutral compounds of formulas (IV) and (V).

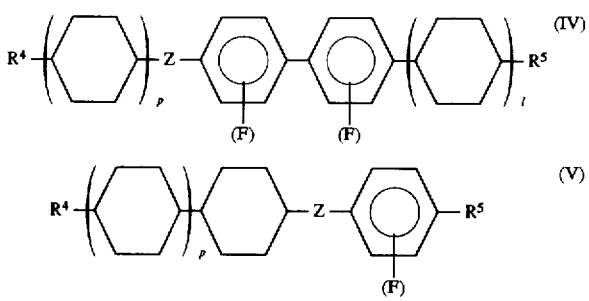

wherein $R^4$ and $R^5$ are the same as described for formulas (II) and (III),

Z is a direct bond or —$CH_2CH_2$—, l and p, independently from each other, are 0 or 1, and

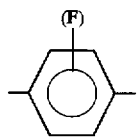

is 1,4-phenylene, 2-fluoro-1,4-phenylene, 3-fluoro-1,4-phenylene or 2,3-difluoro-1,4-phenylene.

The weight proportion of the compounds of formulas (II) to (V) used in the liquid crystal mixtures according to the invention is preferably from 0 to 50% by weight and, in particular, from 0 to 40% by weight.

Liquid crystal compounds according to formula (I) wherein Y is H, F or Cl are defined as SFM materials while compounds with Y=CN are defined as carbonitrile compounds.

LCD's according to the present invention, which are addressed by an active matrix, preferably contain liquid crystal mixtures which are based on SFM compounds. Especially preferred are actively addressed LCD's, wherein the liquid crystal mixture contains at least 40% by weight and, most preferably, not less than 60% by weight of one or more compounds according to formula (I) wherein Y=H, F or Cl. The liquid crystal mixture of actively addressed LCD's according to the present invention preferably contains less than 20% by weight of carbonitrile compounds, especially less than 10% by weight of carbonitrile compounds and, most preferably, no carbonitrile compounds.

The liquid crystal compounds of formula (I) and compounds of formulas (II) to (V) are known, and are prepared by methods known per se, for example, as described in Houben-Weyl, Methoden der Organischen Chemie [Methods of Organic Chemistry], Stuttgart, Germany.

Specific liquid crystal mixtures used in the present invention include superfluorinated materials which are disclosed, for example, in U.S. Pat. No. 4,302,352, U.S. Pat. No. 4,330,426, WO 89-02,884, WO 91-08,184 and WO 91-03,450.

Preferred LC mixtures of the types described above, are commercially available from Merck KGaA, Darmstadt, Germany under the trademark Licristal®.

The present invention is illustrated in more detail by the following examples which, however, do not in any way restrict the scope of the invention.

| GLOSSARY | | |
|---|---|---|
| PMDA | = | pyromellitic dianhydride |
| BPDA | = | 3,3',4,4'-biphenyltetracarboxylic dianhydride |
| BTDA | = | 3,3',4,4'-benzophenonetetracarboxylic dianhydride |
| 6FDA | = | 2,2-bis(3,4-dicarboxyphenyl)hexafluoropropane dianhydride |
| ODPA | = | oxydiphthalic dianhydride |
| DAD | = | 2,3,5,6-tetramethyl-p-phenylene diamine |
| DAM | = | 2,4,6-trimethyl-m-phenylene diamine |
| MPD | = | m-phenylene diamine |
| $Rf_8MPD$ | = | 5-pefluorooctyl-m-phenylene diamine |
| $Rf_{10}MPD$ | = | 5-perfluorodecyl-m-phenylene diamine |
| $Rf_8DAM$ | = | 5-perfluorooctyl-1,3-diaminomesitylene |
| TFMO-BA | = | 4'-trifluoromethoxyphenyl-3,5-diaminobenzamide |
| TMB | = | 3,3',5,5'-tetramethyl-4,4'-diaminodiphenyl |
| FDA | = | 9,9-bis(4-aminophenyl)fluorene |
| 1,5-DAN | = | 1,5-diaminonaphthalene |
| MED | = | 3,3'-dimethyl-5,5'-diethyl-4,4'-diaminodiphenyl methane |
| NMP | = | N-methylpyrrolidone |
| GPC $\bar{M}_w$ | = | weight average molecular weight determined by gel permeation chromatography (polystyrene standards) |
| PI | = | polyimide |
| ITO | = | indium/tin oxide |
| ZLI-2293 | = | a liquid crystal mixture of cyanophenylcyclohexanes and biphenylcyclohexanes having a clearing point of 85° C., a dielectric anisotropy of 10 (1 KHz, 20° C.), an optical anisotropy of 0.1322 (20° C., 589 nm), an ordinary refractive index of 1.4990 and an extraordinary refractive index of 1.6312 (sold by Merck KGaA, Darmstadt, Germany) |
| ZLI-4792 | = | a liquid crystal mixture consisting of terminally fluorinated liquid crystal compounds including 2-ring compounds like phenylcyclohexanes and 3-ring compounds like biphenylcyclohexanes and 4-ring compounds like cyclohexyl biphenylcyclohexanes having a clearing point of 92° C., a dielectric anisotropy of 5.2 (1KHz, 20° C.), an optical anisotropy of 0.0969 (20° C., 589 nm), an ordinary refractive index of 1.4794 and an extraordinary refractive index of 1.5163 (sold by Merck KGaA, Darmstadt Germany) |
| ZLI-1132 | = | a liquid crystal mixture of cyanophenylcyclohexanes and biphenylcyclohexanes having a clearing point of 71° C., a dielectric anisotropy of 13 (1KHz, 20° C.), an optical anisotropy of 0.1396 (20° C., 589 nm) an ordinary refractive index of 1.4930 and an extraordinary refractive index of 1.6326 (sold by Merck KGaA, Darmstadt, Germany) |

Measurement of Tilt Angles

Tilt angle measurements were performed using the crystal rotation method described by G. Baur et al, Physics Letter, Vol 56A, No. 2, 1976, pages 142 to 144.

More specifically, tilt angles were measured using a commercially available set up TBA 101 from Autronic Melchers, Karlsruhe, Germany and a customized set up of Merck KGaA, Darmstadt, Germany, of 50 μm thick planar cells with antiparallel rubbing. The measurement was performed at a temperature of 20° C., after annealing of the cells, i.e. heating the liquid crystals to the isotropic state. The cell preparation is described in more detail in the following Example 1. The interference signal of a He—Ne laser beam (633 nm) was monitored as a function of the angle of incidence of the rotating anisotropic liquid crystal cell. The tilt angles were determined from the symmetry angle of the interference pattern taking into account the refractive indices of the liquid crystals at 633 nm.

Measurement of Voltage Holding Ratio (VHR)

Voltage holding ratio measurements were made as described by T. Jacob et al in *Physical Properties of Liquid Crystals. VIII Voltage Holding Ratio*, Merck KGaA, Darmstadt, Germany.

More specifically, voltage holding ratio measurements were made using an Autronic Melchers VHRM 100 (Karlsruhe, Germany) at ±1 Volt, 60 Hz refresh rate, 64 µs pulse duration and 30 measurements/cycle in 5 or 6 µm thick planar cells with 90° twisted orientation. The preparation of the cells is described in more detail in Example 1. The liquid crystal mixture used was ZLI-4792, from Merck KGaA, unless explicity stated otherwise. The cells were thermostated and readings were taken at 20° C. and after 5 minutes at 100° C.

Measurement of Residual DC (RDC)

The residual DC measurements were performed using the so called "flicker free" method. In this measurement technique the test cell was placed on a Mettler hot stage (FP 80) at 60° C. The hot stage was used in conjunction with a Leitz Orthoplan polarizing microscope. The test cell was addressed using a Wevetek (Model 275) function generator. The light throughput was monitored with a photodiode which was built into the path of the optical beam of the microscope. The test cell was first addressed with ±3V square wave,30 Hz, +3V DC offset voltage for 15 minutes. After this "burn-in" time of 15 minutes the +3V DC offset was switched off. The resulting flicker was monitored and the DC offset voltage was increased until the flickering was no longer visible. The compensating voltage was the residual DC voltage.

The values of all measurements of the tilt angle, the voltage holding ratio and the residual DC given in the following examples are averages of at least two independent measurements of two separate test cells unless explicitly stated otherwise. All physical data given in the examples refer to a temperature of 20° C. unless another temperature is explicitly stated.

EXAMPLE 1

Into a 100 ml reaction kettle equipped with a mechanical stirrer and nitrogen inlet and outlet were charged 3.0000 g (0.018265 mole) of DAD along with 36 ml NMP. After dissolution of the DAD, 4.0570 g (0.0091325 mole) of 6FDA and 2.9428 g (0.0091325 mole) of BTDA powders were added and rinsed in with 4 ml NMP (40 ml NMP total). The reaction mixture was stirred overnight at room temperature under nitrogen. A viscous, yellow poly(amic acid) solution (GPC $\overline{M}w$=249000) resulted which was then diluted with 16.7 ml of NMP. Next, 5.2 ml of acetic anhydride and 2.4 ml of pyridine were sequentially added and the reaction mixture was heated at 50° C. for 3 hours in order to chemically imidize the polymer (GPC $\overline{M}w$=200000). After cooling to room temperature, the polymer solution was precipitated into methanol. The resulting polymer was filtered and then slurried in methanol, and then slurried in 18 ml of deionized water. Filtration and drying in a vacuum oven (nitrogen bleed) at 80° C. yielded the polyimide as a slightly off-white, fluffy solid. A portion of this solid was subsequently dissolved in gamma-butyrolactone to form a 4.5 weight % solution (viscosity 20 cps, cured film thickness 520 angstroms at 3000 RPM spin speed). The diluted PI solution was spin coated onto 7-inch× 7-inch ITO coated glass plates (Corning 7069, alkali free glass). The PI coated glass plates were then placed on a hot plate at 100° C. for 1 minute, followed by curing in an air oven at 180° C. for 1.5 hr. The cured film was then buffed twice unidirectionally with a rayon cloth (YOSHIKAWA YA20R) on a rubbing machine (KETEK, Inc) using the following conditions: radius of rubbing wheel=50 mm, rotation speed=190 rpm, translation speed of glass plate=25 mm/sec, pile impression=0.3 mm. For tilt angle measurements, the coated glass plates were assembled so that their respective rubbing directions were anti-parallel to each other. The spacing between the glass plates was set at 50 µm by incorporation of glass fibers into the UV curable adhesive placed around the perimeter of the plates, followed by curing of the adhesive. Two small gaps in the adhesive were left to allow filling of the cell. The liquid crystal mixture was filled into the gap between the plates via capillary action. The completed cell was placed in an oven at 120° C. for 20 minutes to allow for complete isotropization of the LC mixture. The test cells were then cooled and stored at room temperature for 12 hrs prior to measurement of the tilt angle. For voltage holding ratio and residual DC measurements, the coated glass plates were assembled so that their respective rubbing directions were perpendicular to each other. The spacing between the glass plates was set at 6 µm by incorporation of glass fibers into the adhesive around the perimeter of the plates, followed by curing of the adhesive. Two small filling holes were left to allow filling of the cell. The liquid crystal mixture was filled into the gap between the plates via capillary action. The active area (area coated with ITO) was 1 cm$^2$.

The liquid crystal test cell containing the polyimide of Example 1 as alignment layer and ZLI-4792 (Merck KGaA, Darmstadt Germany) as liquid crystal mixture exhibited an initial tilt angle of 2.1°. Post heat treatment of the test cells at 150° C. for 1 hour resulted in a stable tilt angle of 2.1°. A high voltage holding ratio, VHR (after 5 minutes at 100° C.) of 99.5% and a low residual DC (RDC) of 0 mV were also obtained. Results are given in Table I.

These properties were maintained both after storage for 2 hours under UV irradiation and for 10 hours at 80° C.

EXAMPLES 2 TO 23

(Comparative Examples C1 and C2)

In a similar manner to Example 1, several other polyimides were prepared and evaluated as alignment layers for active matrix liquid crystal displays. Table I lists the composition of these polymers, the tilt angle, voltage holding ratio (VHR) and residual DC (RDC) results. Polymer isolation procedures were varied as noted in the table. Examples 16 and 18 were prepared by a thermal imidization process by heating at 180° C. to 200° C. instead of by chemical imidization.

Comparative Examples C1 and C2 provided very low tilt angles and, therefore, were not suitable for use in active matrix liquid crystal displays.

Comparative Examples C3 and C4

Polyimide alignment films were prepared as described in Example 1, except that ZLI-1132 and ZLI-2293, respectively, (from Merck KGaA, Darmstadt, Germany) were used as the liquid crystal mixtures in place of ZLI-4792. Both ZLI-1132 and ZLI-2293 are disclosed as the liquid crystal mixtures used in the STN liquid crystal displays in European Patent Application 0 365 855.

The voltage holding ratios at room temperature were 73+/−5% (+/−5% estimated absolute uncertainty) and 91+/

−2%, respectively, while those at 100° C. after 5 minutes were 12+/−8% and 20+/−10%, respectively, showing that the combination of the liquid crystal mixtures of EPA 0 365 855 and the polyimide alignment film of the present invention are not suitable for use active matrix displays due to low voltage holding ratios.

What is claimed is:

1. A polyimide alignment film for aligning a liquid crystal layer of an active matrix liquid crystal display device comprising an aromatic tetracarboxylic dianhydride component containing from 40 to 100 mole %, based on the total molar amount of aromatic tetracarboxylic dianhydride

TABLE 1

| Example No. | Monomers (mole %) | Ppt./ Wash | PI ($M_w$) | Tilt Angle (Initial) (degrees) | Tilt Angle (150° C. 1 hr. heat treatment (degrees) | VHR (5 min., 100° C.) (%) | RDC (mV) |
|---|---|---|---|---|---|---|---|
| 1 | 6FDA/BTDA/DAD (50/50/100) | MeOH/ $H_2O$ | 200000' | 2.1 | 2.1 | 99.5 | 0 |
| 2 | 6FDA/BTDA/DAD (50/50/100) | MeOH/ $H_2O$ | 271000' | 2.5 | 2.4 | 99.3 | 50 |
| 3 | 6FDA/BTDA/DAD (50/50/100) | MeOH/ $H_2O$ | 343000* | 2.4 | 2.4 | 99.1 | 0 |
| 4 | 6FDA/BTDA/DAD (80/20/100) | $H_2O$/ $H_2O$ | 331000* | 2.8 | 2.6 | 99.1 | 100 |
| 5 | 6FDA/BPDA/DAD (80/20/100) | $H_2O$/ $H_2O$ | 198000* | 3.8 | 3.5 | 98.7 | 100 |
| 6 | 6FDA/PMDA/DAD (80/20/100) | $H_2O$/ $H_2O$ | 240000* | 3.5 | 3.2 | 99.0 | 50 |
| 7 | 6FDA/PMDA/DAD (70/30/100) | $H_2O$/ $H_2O$ | 272000* | 3.7 | 3.1 | 99.1 | 50 |
| 8 | 6FDA/ODPA/DAD (80/20/100) | $H_2O$/ $H_2O$ | 153000* | 2.8 | 2.3 | 98.5 | 60 |
| 9 | 6FDA/DAD (100/100) | $H_2O$/ $H_2O$ | 268000' | 3.5 | 3.3 | 97.7 | 80 |
| 10 | 6FDA/BTDA/DAD/DAM (50/50/50/50) | $H_2O$/ $H_2O$ | 188000* | 1.8 | 1.7 | 99.4 | 60 |
| 11 | 6FDA/PMDA/DAM (80/20/100) | $H_2O$/ $H_2O$ | — | 2.5 | 2.3 | — | 90 |
| 12 | 6FDA/DAM (100/100) | MeOH/ $H_2O$ | 192000' | 2.5 | 2.1 | — | 50 |
| 13 | 6FDA/BTDA/DAM (50/50/100) | $H_2O$/ $H_2O$ | 321000* | 1.5 | 1.4 | 99.3 | 170 |
| 14 | 6FDA/BTDA/DAD/Rf8DAM (50/50/95/5) | MeOH/ $H_2O$ | 91900* | 3.4 | 3.4 | 99.0 | 150 |
| 15 | 6FDA/BTDA/DAD/Rf8DAM (50/50/95/5) | $H_2O$/ $H_2O$ | 89600* | 3.3 | 3.5 | 98.8 | 40 |
| 16 | 6FDA/BTDA/DAD/Rf8DAM (50/50/95/5) | $H_2O$/ $H_2O$ | 381000' | 3.3 | 3.1 | 98.7 | 70 |
| 17 | 6FDA/BTDA/DAD/Rf8DAM (50/50/95/5) | MeOH/ $H_2O$ | 104000* | 2.6 | 2.7 | 98.6 | 60 |
| 18 | 6FDA/BTDA/DAD/Rf8MPD (50/50/95/5) | MeOH/ $H_2O$ | 187000' | 3.8 | 3.8 | 98.0 | 100 |
| 19 | 6FDA/BTDA/DAD/Rf10MPD (50/50/95/5) | MeOH/ $H_2O$ | 215000* | 4.5 | 4.5 | 97.7 | 150 |
| 20 | 6FDA/BTDA/DAD/TFMO-BA (50/50/90/10) | MeOH/ $H_2O$ | 288000* | 3.0 | 3.0 | 98.6 | 100 |
| 21 | 6FDA/1,5-DAN (100/100) | MeOH/ $H_2O$ | 131000' | 2.2 | 2.1 | 98.9 | 50 |
| 22 | 6FDA/MPD/DAD (100/75/25) | $H_2O$/ $H_2O$ | 160000* | 2.0 | 1.7 | 97.5 | 300 |
| 23 | 6FDA/DAD/TMB (100/50/50) | MeOH/ $H_2O$ | 159000* | 2.3 | 1.8 | 97.3 | 200 |
| C1 | 6FDA/MED (100/100) | MeOH/ $H_2O$ | — | 0.4 | 0.2 | 95.6 | 180 |
| C2 | 6FDA/FDA (100/100) | MeOH/ $H_2O$ | 265000' | 0.1 | 0.1 | 97.1 | 70 |

*Mw (GPC) of isolated and dried polyimide
'Mw from as-prepared polyimide in solution component, of 2,2-bis(3,4-dicarboxyphenyl)-hexafluoropropane dianhydride and an aromatic diamine component containing from 80 to 100 mole %, based on the total molar amount of aromatic diamine component, of an aromatic diamine of the formula

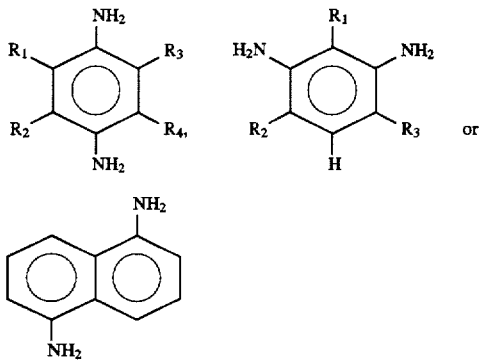

wherein $R_1$ and $R_4$ are alkyl groups containing from 1 to 4 carbon atoms and wherein said polyimide alignment film provides said liquid crystal layer with (i) a voltage holding ratio of greater than 95% and (ii) a tilt angle of at least one degree.

2. The polyimide alignment film of claim 1 wherein the aromatic tetracarboxylic dianhydride component comprises from 50 to 100 mole %, based on the total molar amount of aromatic tetracarboxylic dianhydride component, of 2,2-bis (3,4-dicarboxyphenyl)-hexafluoropropane dianhydride and wherein the aromatic diamine component comprises from 90 to 100 mole %, based on the total molar amount of aromatic diamine component, of said aromatic diamine.

3. The polyimide alignment film of claim 2 wherein said aromatic diamine comprises 2,3,5,6-tetramethyl-p-phenylene diamine, 2,4,6-trimethyl-m-phenylene diamine or 1,5-diaminonaphthalene.

4. A polyimide alignment film for aligning a liquid crystal layer of an active matrix liquid crystal display device comprising an aromatic tetracarboxylic dianhydride component containing from 50 to 80 mole % of 2,2-bis(3,4-dicarboxyphenyl)hexafluoropropane dianhydride, from 20 to 50 mole % of at least one additional tetracarboxylic dianhydride, and an aromatic diamine of the formula

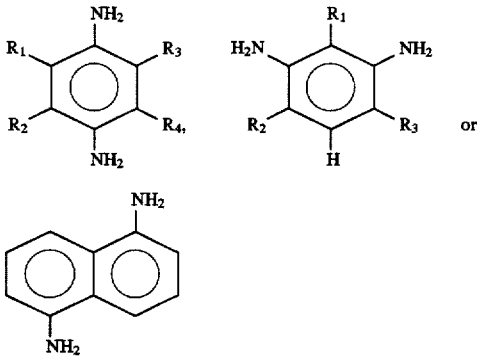

wherein $R_1$ and $R_4$ are alkyl groups containing from 1 to 4 carbon atoms and wherein said polyimide alignment film provides said liquid crystal layer with (i) a voltage holding ratio of greater than 98% and (ii) a tilt angle of more than two degrees.

5. The polyimide alignment film of claim 4 wherein the additional tetracarboxylic dianhydride is selected from the group consisting of 3,3'4,4'-biphenyltetracarboxylic dianhydride, 2,3,3',4'-biphenyltetracarboxylic dianhydride, 3,3',4,4'-benzophenonetetracarboxylic dianhydride, 2,2-bis-(3,4-dicarboxyphenyl)propane dianhydride, 1,4,5,8-naphthalenetetracarboxylic dianhydride, 2,3,6,7-naphthalenetetracarboxylic dianhydride, 1,2,5,6-naphthalenetetracarboxylic dianhydride, bis(3,4-dicarboxyphenyl)sulfone dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)methane dianhydride, oxydiphthalic dianhydride, 1,4-bis(3,4-dicarboxyphenoxy)benzene dianhydride, 1,3-bis(3-4-dicarboxybenzoyl)benzene dianhydride, pyromellitic dianhydride, 9,9-bis (trifluoromethyl)-2,3,6,7-xanthenetetracarboxylic dianhydride, 9-phenyl-9-(trifluoromethyl)-2,3,6,7-xanthenetetracarboxylic dianhydride , 2,3,5-tricarboxycyclopentyl acetic acid dianhydride and cyclobutanetetra-carboxylic dianhydride.

6. The polyimide alignment film of claim 5 comprising from 50 to 80 mole % of 2,2-bis(3,4-dicarboxyphenyl) hexafluoropropane dianhydride, from 20 to 50 mole % of 3,3'4,4'-benzophenonetetracarboxylic dianhydride and 2,3,5,6-tetramethyl-p-phenylene diamine or 2,4,6-trimethyl-m-phenylene diamine.

7. The polyimide alignment film of claim 6 comprising 50 mole % of 2,2-bis(3,4-dicarboxy-phenyl)hexafluoropropane dianhydride, 50 mole % of 3,3'4,4'-benzophenonetetracarboxylic dianhydride and 2,3,5,6-tetramethyl-p-phenylene diamine.

8. The polyimide alignment film of claim 1 wherein the aromatic tetracarboxylic component contains, in addition to the 2,2-bis(3,4-dicarboxyphenyl)-hexafluoropropane dianhydride, from 0 to 60 mole % of at least one additional tetracarboxylic dianhydride; and wherein the aromatic diamine component contains, in addition to said aromatic diamine, from 0 to 20 mole % of an aromatic diamine containing an alkyl, fluoroalkyl or perfluoroalkyl group containing from 1 to 16 carbon atoms.

9. The polyimide alignment film of claim 8 wherein the aromatic diamine has the formula

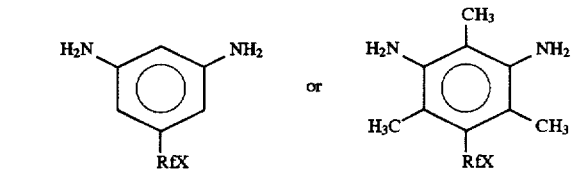

wherein RfX is a straight or branched chain alkyl, fluoroalkyl or perfluoroalkyl group containing from 1 to 16 carbon atoms.

10. The polyimide alignment film of claim 8 wherein the aromatic diamine has the formula Ar—O—$CH_2$—RfX, AR—$CH_2$—RfX, Ar—C($CH_3$)$_2$—RfX, Ar—$CH_2$O—($CH_2$)$_{1-6}$—RfX, Ar—COO($CH_2$)$_2$—RfX, Ar—CO—RfX, Ar—COO—$C_6H_4$—RfX, Ar—COO—$C_6H_4$—ORfX, Ar—CONH—$C_6H_4$—RfX, Ar—CONH—$C_6H_4$—ORfX or Ar—COHN—RfX, wherein AR has the formula

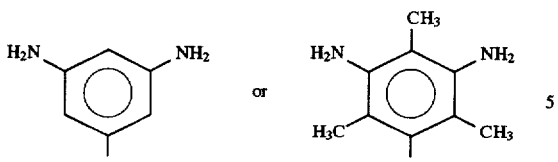

and Rfx is a straight or branched chain alkyl, fluoroalkyl or perfluoroalkyl group containing from 1 to 16 carbon atoms.

11. The polyimide alignment film of claim 9 wherein the aromatic diamine comprises 5-perfluorooctyl-m-phenylene diamine, 5-perfluorodecyl-m-phenylene diamine or 5-perfluorooctyl-1,3-diamino-mesitylene.

12. An active matrix liquid crystal display device comprising:

(a) a liquid crystal layer having opposite sides;

(b) a set of electrodes on either side of said liquid crystal layer; and (c) a polyimide alignment film layer, between each set of electrodes and said liquid crystal layer, wherein the improvement comprises the polyimide alignment film layer is derived from an aromatic tetracarboxylic dianhydride component containing from 40 to 100 mole %, based on the total molar amount of aromatic tetracarboxylic dianhydride component, of 2,2-bis(3,4-dicarboxyphenyl)-hexafluoropropane dianhydride and an aromatic diamine component containing from 80 to 100 mole %, based on the total molar amount of aromatic diamine component, of an aromatic diamine of the formula

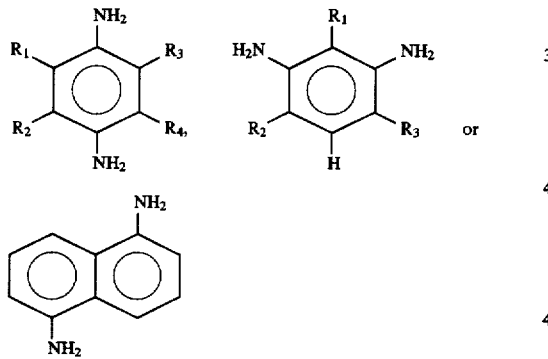

wherein $R_1$ and $R_4$ are alkyl groups containing from 1 to 4 carbon atoms and wherein said polyimide alignment film provides said liquid crystal layer with (i) a voltage holding ratio of greater than 95% and (ii) a tilt angle of more than one degree.

13. The active matrix liquid crystal display device of claim 12 wherein the liquid crystal layer comprises a mixture of at least one compound of the formula

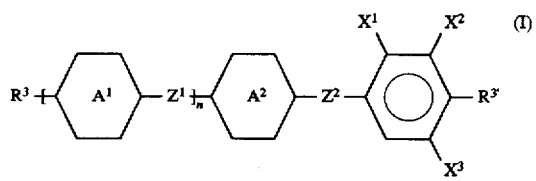

wherein $R^3$ is an alkyl group containing from 1 to 12 carbon atoms wherein, in addition, one or two non-adjacent —$CH_2$— groups can be replaced by —O—, —CO—, —COO—, —OCO— or —CH=CH—;

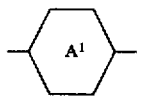

and

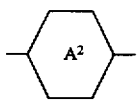

independently of one another, are trans-1,4-cyclohexylene, 1,4-phenylene, 2-fluoro-1,4-phenylene, 3-fluoro-1,4-phenylene, 2,3-difluoro-1,4-phenylene or 3,5-difluoro-1,4-phenylene, or one of

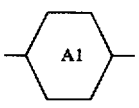

and

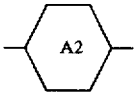

is alternatively pyrimidine-2,5-diyl, pyridine-2,5-diyl or trans-1,4-dioxane-2,5-diyl;

$Z_1$ and $Z_2$, independently of one another, are a direct bond, —$CH_2CH_2$—, —COO—, —OCO—, —CH=CH— or —C≡C—;

$X^1$, $X^2$ and $X^3$, independently of one another, are H or F;

$R^{3'}$ is the same as $R^3$ or is Q—Y;

Q is —$CF_2$—, —$OCF_2$—, —$C_2F_4$— or a direct bond;

Y is H, F, Cl or CN; and n is 0, 1 or 2.

14. The active matrix liquid crystal display device of claim 13 wherein the polyimide alignment film comprises from 50 to 80 mole % of 2,2-bis(3,4-dicarboxy-phenyl) hexafluoropropane dianhydride, from 20 to 50 mole % of 3,3',4,4'-benzophenonetetracarboxylic dianhydride and 2,3,5,6-tetramethyl-p-phenylene diamine and wherein said polyimide alignment film provides said liquid crystal layer with a voltage holding ratio of greater than 98%.

15. The polyimide alignment film of claim 1 wherein the voltage holding ratio is greater than 99% and the tilt angle is more than 4 degrees.

16. The active matrix liquid crystal display device of claim 12 wherein the voltage holding ratio is greater than 99% and the tilt angle is more than 4 degrees.

* * * * *